United States Patent
Wishman et al.

(10) Patent No.: US 9,209,622 B2
(45) Date of Patent: Dec. 8, 2015

(54) RACK POWER DISTRIBUTION UNIT WITH DETACHABLE CABLES

(71) Applicant: Amazon Technologies, Inc., Reno, NV (US)

(72) Inventors: Max J. Wishman, Seattle, WA (US); Darin Lee Frink, Lake Tapps, WA (US); Peter George Ross, Olympia, WA (US); Chao Chen, Bellevue, WA (US); Christopher Nathan Watson, Seattle, WA (US)

(73) Assignee: Amazon Technologies, Inc., Reno, NV (US)

( * ) Notice: Subject to any disclaimer, the term of this patent is extended or adjusted under 35 U.S.C. 154(b) by 0 days.

(21) Appl. No.: 14/557,110

(22) Filed: Dec. 1, 2014

(65) Prior Publication Data

US 2015/0084419 A1    Mar. 26, 2015

Related U.S. Application Data

(63) Continuation of application No. 13/560,653, filed on Jul. 27, 2012, now Pat. No. 8,902,569.

(51) Int. Cl.
*G06F 1/26* (2006.01)
*H02J 3/04* (2006.01)
*H02J 3/00* (2006.01)

(52) U.S. Cl.
CPC ... *H02J 3/04* (2013.01); *G06F 1/26* (2013.01); *H02J 3/005* (2013.01); *Y10T 307/344* (2015.04); *Y10T 307/735* (2015.04)

(58) Field of Classification Search
CPC .................................. G06F 1/26; H02J 3/005
See application file for complete search history.

(56) References Cited

U.S. PATENT DOCUMENTS

| | | | |
|---|---|---|---|
| 4,361,372 A | 11/1982 | Majkrzak et al. | |
| 5,096,434 A * | 3/1992 | Byrne | 439/215 |
| 5,164,544 A * | 11/1992 | Snodgrass et al. | 174/495 |
| 5,178,555 A * | 1/1993 | Kilpatrick et al. | 439/215 |
| 5,582,522 A * | 12/1996 | Johnson | 439/214 |
| 5,754,040 A | 5/1998 | Shannon | |
| 5,821,636 A | 10/1998 | Baker et al. | |
| 6,036,516 A * | 3/2000 | Byrne | 439/215 |
| 6,608,403 B2 | 8/2003 | Liu et al. | |
| 6,628,009 B1 | 9/2003 | Chapel | |
| 6,657,319 B2 | 12/2003 | Sanada | |

(Continued)

FOREIGN PATENT DOCUMENTS

| | | | | |
|---|---|---|---|---|
| CN | 201410470766 A | * | 12/2014 | G06F 1/26 |
| JP | 55051364 | | 4/1980 | |

OTHER PUBLICATIONS

U.S. Appl. No. 13/234,067, filed Sep. 15,2011, Peter G. Ross.

*Primary Examiner* — Robert J. Hoffberg
(74) *Attorney, Agent, or Firm* — Robert C. Kowert; Meyertons, Hood, Kivlin, Kowert & Goetzel, P.C.

(57) ABSTRACT

A system includes a rack, computing devices coupled to the rack, a rack PDU, and one or more input power cables. The rack PDU includes an enclosure, two or more power input receptacles on the enclosure, and two or more power output receptacles on the enclosure. The output power receptacles supply power to the computing devices. The input power cables are coupled in one or more of the power input receptacles. The input power cables supply electrical power from an electrical power system to the rack PDU.

18 Claims, 7 Drawing Sheets

(56) References Cited

U.S. PATENT DOCUMENTS

| | | | |
|---|---|---|---|
| 6,768,225 B2 | 7/2004 | Chang et al. | |
| 6,826,036 B2 | 11/2004 | Pereira | |
| 6,863,546 B2 | 3/2005 | Yang et al. | |
| 6,882,530 B2 | 4/2005 | Cyphers et al. | |
| 7,031,171 B2 | 4/2006 | Marcotte et al. | |
| 7,037,142 B2 | 5/2006 | Evans | |
| 7,116,550 B2 | 10/2006 | Ewing et al. | |
| 7,196,900 B2 | 3/2007 | Ewing et al. | |
| 7,268,998 B2 | 9/2007 | Ewing et al. | |
| 7,312,980 B2 | 12/2007 | Ewing et al. | |
| 7,374,436 B2 | 5/2008 | Schell et al. | |
| 7,400,493 B2 | 7/2008 | Ewing et al. | |
| 7,447,002 B2 * | 11/2008 | Ewing et al. | 361/623 |
| 7,535,696 B2 | 5/2009 | Ewing et al. | |
| 7,567,430 B2 | 7/2009 | Ewing et al. | |
| 7,742,284 B2 * | 6/2010 | Ewing et al. | 361/623 |
| 7,905,737 B2 * | 3/2011 | Byrne | 439/215 |
| 7,905,749 B2 | 3/2011 | Cleveland | |
| 7,982,335 B2 * | 7/2011 | Aldag et al. | 307/12 |
| 8,004,827 B2 * | 8/2011 | Ewing et al. | 361/623 |
| 8,174,149 B2 | 5/2012 | Chapel et al. | |
| 8,207,627 B2 * | 6/2012 | Aldag et al. | 307/12 |
| 8,264,099 B2 * | 9/2012 | Aldag et al. | 307/12 |
| 8,444,425 B2 * | 5/2013 | Byrne | 439/215 |
| 8,500,465 B1 * | 8/2013 | Ross et al. | 439/79 |
| 8,605,091 B2 * | 12/2013 | Bradbury et al. | 345/440 |
| 8,686,594 B2 * | 4/2014 | Morales et al. | 307/64 |
| 8,687,348 B2 | 4/2014 | Peplinski et al. | |
| 8,902,569 B1 | 12/2014 | Wishman et al. | |
| 8,994,213 B1 * | 3/2015 | Czamara et al. | 307/64 |
| 9,041,250 B1 * | 5/2015 | Czamara | 307/64 |
| 9,048,598 B2 * | 6/2015 | Byrne et al. | 1/1 |
| 2003/0129865 A1 | 7/2003 | Kato et al. | |
| 2005/0041952 A1 | 2/2005 | Ko | |
| 2006/0105597 A1 | 5/2006 | Purwin | |
| 2010/0169531 A1 | 7/2010 | Bae | |
| 2011/0245988 A1 | 10/2011 | Ingels et al. | |
| 2012/0275084 A1 | 11/2012 | Familiant et al. | |
| 2012/0293932 A1 | 11/2012 | Jai | |
| 2013/0095681 A1 * | 4/2013 | Byrne | 439/212 |
| 2014/0179132 A1 * | 6/2014 | Byrne | 439/92 |
| 2014/0210270 A1 * | 7/2014 | Morales et al. | 307/64 |

\* cited by examiner

RACK POWER DISTRIBUTION UNIT WITH DETACHABLE CABLES

This application is a continuation of U.S. patent application Ser. No. 13/560,653, filed Jul. 27, 2012, now U.S. Pat. No. 8,902,569.

BACKGROUND

Organizations such as on-line retailers, Internet service providers, search providers, financial institutions, universities, and other computing-intensive organizations often conduct computer operations from large scale computing facilities. Such computing facilities house and accommodate a large amount of server, network, and computer equipment to process, store, and exchange data as needed to carry out an organization's operations. Typically, a computer room of a computing facility includes many server racks. Each server rack, in turn, includes many servers and associated computer equipment.

Because the computer room of a computing facility may contain a large number of servers, a large amount of electrical power may be required to operate the facility. In addition, the electrical power is distributed to a large number of locations spread throughout the computer room (e.g., many racks spaced from one another, and many servers in each rack). Usually, a facility receives a power feed at a relatively high voltage. This power feed is stepped down to a lower voltage (e.g., 110V). A network of cabling, bus bars, power connectors, and power distribution units, is used to deliver the power at the lower voltage to numerous specific components in the facility.

In some computer systems, one or more rack-level power distribution units are provided in a rack to distribute electrical power to the many servers in the rack. Each of the rack-level power distribution units may include a case with a large number of receptacles, each of which may be used to supply power to a different server, and a built-in input power cable that passes out of the case. Rack-level power distribution units may be attached to one or both interior sides of the rack near one end of the rack.

In some facilities, power is supplied to racks either through the tops of the racks or the bottoms of the racks. For example, power may be fed through the bottom of a rack from floor power distribution units or power panels under a false floor in a room of the data center. In some cases, rack PDUs are pre-installed in rack before the rack is placed in the data center. If the input power cable for the rack PDU is oriented in the wrong direction (for example, extending from the top of the rack PDU of a data center where power is fed from the bottoms of the racks), routing and cable management may be significantly more difficult (for example, longer cable runs, more cable bends, and more crossing/interweaving of input cables with other cables). In some cases, the rack PDU may be removed and the orientation reversed (inverting top with bottom, for example) to improve routing. Removing and reorienting rack PDUs may, however, be laborious (and thus add to installation costs), especially if the process must be repeated for many racks.

From time to time, rack PDUs operating in a data center may fail and need to be replaced. Removing a rack PDU may involve disconnecting a power input cable from a power source and feeding the power input cable into the rack (for example, through the bottom of the rack and false floor). Installing the replacement rack PDU may involve feeding the new power input cable back through and connecting to the power source.

Primary power systems for computer systems in operation typically need to be maintained or reconfigured from time to time. Some data centers, for example, have "single threaded" distribution via the electrical power supply to the floor and/or to the rack, and in which maintenance can only be performed when the components using power in the data center, such as servers, are shut-off. The down-time associated with maintenance and reconfiguration of primary power systems in a data center may result in a significant loss in computing resources. In some critical systems such as hospital equipment and security systems, down-time may result in significant disruption and, in some cases, adversely affect health and safety.

Figure 1:
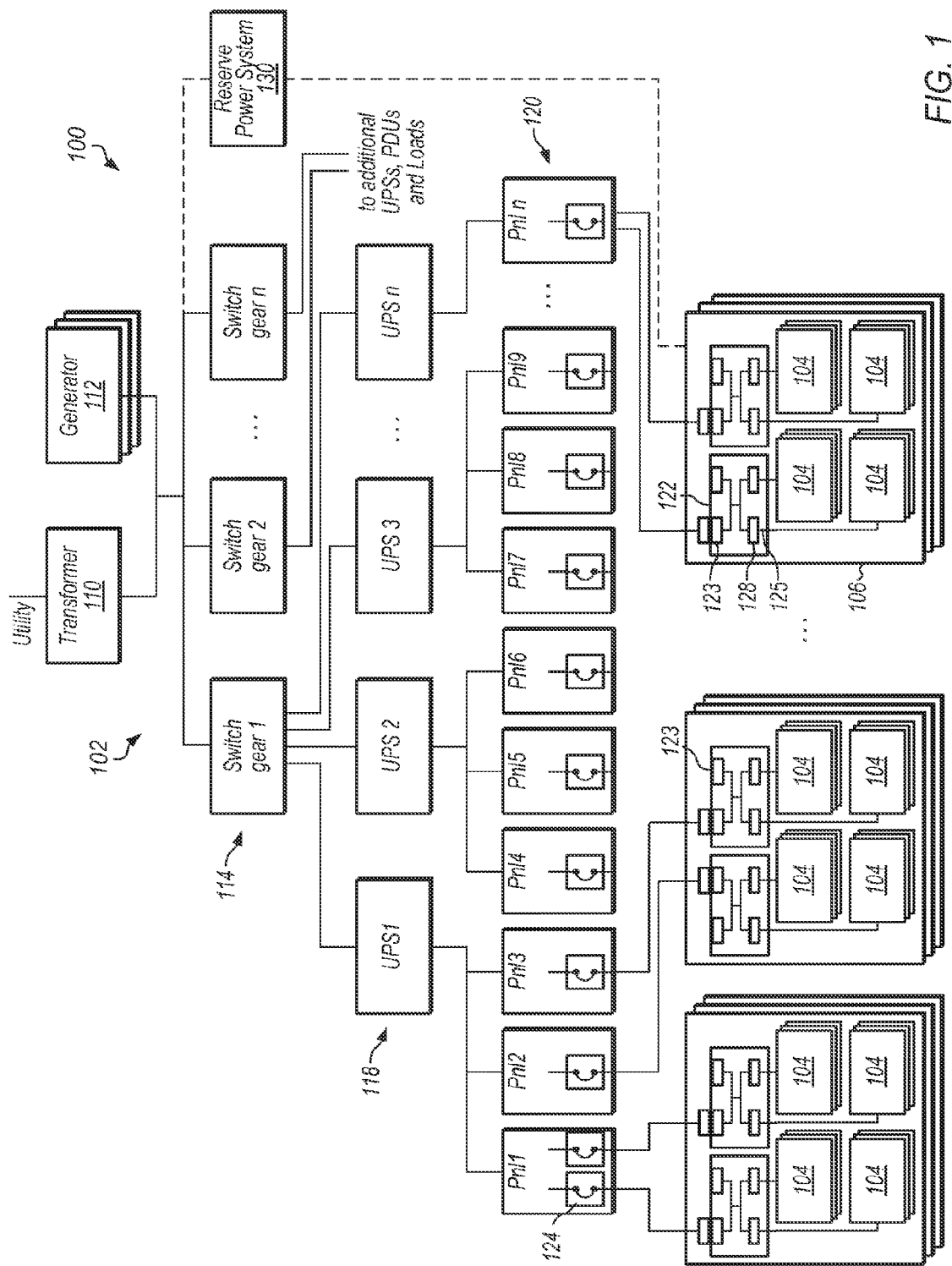
FIG. 1 is a block diagram illustrating one embodiment of a power distribution system including rack power distribution units with multiple power input receptacles.

While the invention is susceptible to various modifications and alternative forms, specific embodiments thereof are shown by way of example in the drawings and will herein be described in detail. It should be understood, however, that the drawings and detailed description thereto are not intended to limit the invention to the particular form disclosed, but on the contrary, the intention is to cover all modifications, equivalents and alternatives falling within the spirit and scope of the present invention as defined by the appended claims. The headings used herein are for organizational purposes only and are not meant to be used to limit the scope of the description or the claims. As used throughout this application, the word "may" is used in a permissive sense (i.e., meaning having the potential to), rather than the mandatory sense (i.e., meaning must). Similarly, the words "include," "including," and "includes" mean including, but not limited to.

DETAILED DESCRIPTION OF EMBODIMENTS

Various embodiments of rack power distribution units, and methods of implementing and maintaining systems using rack power distribution units, are disclosed. According to one embodiment, a system includes a rack, computing devices coupled to the rack, a rack PDU, and one or more input power cables. The rack PDU includes an enclosure, two or more power input receptacles on the enclosure, and two or more power output receptacles on the enclosure (for example, one power input receptacle near the top of the enclosure and another power input receptacle near the bottom of the enclosure). The output power receptacles supply power to the computing devices. The input power cables are coupled in one or more of the power input receptacles. The input power cables supply electrical power from an electrical power system to the rack PDU.

According to one embodiment, a rack power distribution unit (PDU) includes an enclosure, two or more power input receptacles on the enclosure, and two or more power output receptacles on the enclosure. The power input receptacles are wired in parallel with one another. The power output receptacles supply power to electrical systems.

According to on embodiment, a method includes providing a rack power distribution unit (PDU) with two or more rack PDU input power receptacles, and coupling a power cable to one or more of the rack PDU input power receptacles.

As used herein, a "cable" includes any cable, conduit, or line that carries one or more conductors and that is flexible over at least a portion of its length. A cable may include a connector portion, such as a plug, at one or more of its ends.

As used herein, "computing" includes any operations that can be performed by a computer, such as computation, data storage, data retrieval, or communications.

As used herein, "computing device" includes any of various devices in which computing operations can be carried out, such as computer systems or components thereof. One example of a computing device is a rack-mounted server. As used herein, the term computing device is not limited to just those integrated circuits referred to in the art as a computer, but broadly refers to a processor, a server, a microcontroller, a microcomputer, a programmable logic controller (PLC), an application specific integrated circuit, and other programmable circuits, and these terms are used interchangeably herein. Some examples of computing devices include e-commerce servers, network devices, telecommunications equipment, medical equipment, electrical power management and control devices, and professional audio equipment (digital, analog, or combinations thereof). In various embodiments, memory may include, but is not limited to, a computer-readable medium, such as a random access memory (RAM). Alternatively, a compact disc-read only memory (CD-ROM), a magneto-optical disk (MOD), and/or a digital versatile disc (DVD) may also be used. Also, additional input channels may include computer peripherals associated with an operator interface such as a mouse and a keyboard. Alternatively, other computer peripherals may also be used that may include, for example, a scanner. Furthermore, in the some embodiments, additional output channels may include an operator interface monitor and/or a printer.

As used herein, "computer room" means a room of a building in which computer systems, such as rack-mounted servers, are operated.

As used herein, "data center" includes any facility or portion of a facility in which computer operations are carried out. A data center may include servers dedicated to specific functions or serving multiple functions. Examples of computer operations include information processing, communications, simulations, and operational control.

As used herein, one component in a power distribution system is "downstream" from another component in the power distribution system if the one component receives power from the other component or is at a lower level in the power distribution system than the other component. For example, a floor PDU may be downstream from a UPS, or a power supply unit in a server may be downstream from a rack PDU.

As used herein "floor-level", as applied to a component or system, means the component or system serves two or more racks on the floor of a computer room or other facility.

As used herein, "floor power distribution unit" refers to a power distribution unit that can distribute electrical power to various components in a computer room. In certain embodiments, a floor power distribution unit includes a transformer. In one embodiment, a floor power distribution unit includes a k-rated transformer. A power distribution unit may be housed in an enclosure, such as a cabinet.

As used herein, a "match", in the context of matching sets of power lines, means that the characteristics between the sets of power lines are similar to one another within acceptable limits. A match does not require that the measurements of the two items be precisely equal. In some embodiments, the acceptable variance levels for a match are predetermined. For example, in one embodiment, for a voltage level match, an input power line may be predetermined to match a feed line if the difference in measured voltage between the two lines is 7 volts or less. Various characteristics, such as voltage, waveform, etc. may be used as criteria to determine a match.

As used herein, a "module" is a component or a combination of components physically coupled to one another. A module may include functional elements and systems, such as computer systems, circuit boards, racks, blowers, ducts, and power distribution units, as well as structural elements, such a base, frame, housing, or container.

As used herein "PDU-level", as applied to a component or system, means the component or system serves a single PDU, or electrical systems coupled to a single PDU.

As used herein, "power distribution unit" means any device, module, component, or combination thereof, that can be used to distribute electrical power. The elements of a power distribution unit may be embodied within a single component or assembly (such as a transformer and a rack power distribution unit housed in a common enclosure), or may be distributed among two or more components or assemblies (such as a transformer and a rack power distribution unit each housed in separate enclosure, and associated cables, etc.). A power distribution unit may include a transformer, power monitoring, fault detection, isolation.

As used herein, "power panel" means any panel, device, module, component, or combination thereof, that can be used to transfer or distribute electrical power from one or more input conductors to one or more output conductors. In certain embodiments, a remote power panel includes main lug only panel conductors. A remote power panel may be housed in an enclosure, such as a cabinet.

As used herein, "primary power" means any power that can be supplied to an electrical load, for example, during normal operating conditions.

As used herein, a "rack" means a rack, container, frame, or other element or combination of elements that can contain or physically support one or more computing devices.

As used herein, a "rack computing system" means a computing system that includes one or more computing devices mounted in a rack.

As used herein "rack-level", as applied to a component or system, means the component or system serves electrical systems in a particular rack.

As used herein, "rack power distribution unit" refers to a power distribution unit that can be used to distribute electrical power to various components in a rack. A rack power distribution may include various components and elements, including wiring, bus bars, connectors, and circuit breakers. In some embodiments, a rack power distribution unit may distribute power to only some of the electrical systems in a rack. In some embodiments, a single rack includes two or more rack power distribution units that distribute power to different sets of electrical systems in the rack. For example, one rack may include a left rack power distribution unit that distributes power to half of the servers in the rack, and a right rack power distribution unit that distributes power to the other half of the servers in the rack.

As used herein, "reserve power" means power that can be supplied to an electrical load upon the failure of, or as a substitute for, primary power to the load.

As used herein, a "secondary feed" refers to any feed that supplies power that is separate from a primary power system for at least a portion of a primary power chain. As used herein, a "tertiary feed" refers to any feed that supplies power that is separate from two power systems (such as a primary power system and a reserve power system) for at least a portion of the two power system chains. In some embodiments, a secondary power feed or tertiary feed may be completely independent of the primary power distribution system. In some embodiments, however, a secondary feed or tertiary feed is not completely independent of the primary power distribution system. For example, both the primary power distribution system and a secondary feed may both receive power from the same utility feed, the same step-down transformer (for example, a primary-side transformer), the same uninterruptible power supply (for example, a primary-side), etc.

As used herein, one component in a power distribution system is "upstream" from another component in the power distribution system if the one component supplies power to the other component or is at a higher level in the power distribution system than the other component. For example, a UPS may be upstream from a floor PDU, or a rack PDU may be upstream from a power supply unit for a server.

In some embodiments, a system includes racks that hold computing devices fed by a rack PDU with multiple power input receptacles. The multiple power input receptacles may allow for connecting power at multiple locations on the rack PDU. In one embodiment, one of the power input receptacles may be near the top of the rack PDU, and another of the power input receptacles is near the bottom of the rack PDU. A power cable may be coupled to one or both of the input receptacles. The power cable may supply power to the computing devices through the rack PDU.

FIG. 1 is a block diagram illustrating one embodiment of a power distribution system including rack power distribution units with multiple power input receptacles. System 100 includes power distribution system 102 and electrical systems 104. In one embodiment, system 100 is a data center. Electrical systems 104 may include, for example, computing devices, rack-mounted servers, network control devices, power supply units, air moving devices, and mass storage devices. Electrical systems 104 may be supported in racks 106. Electrical systems 104 may perform various functions in a data center, such as data storage or network services. In one embodiment, electrical systems 104 are servers in a server room of a data center.

Each of electrical systems 104 may include a power supply unit. The power supply unit may supply power to various electrical components, such as integrated circuits, central processing units, solid state memory, and hard disk drives in electrical systems 104.

Power distribution system 102 includes transformer 110, generators 112, switchgear apparatus 114, and primary power systems 116. Each of primary power systems 116 includes UPS 118 and one or more power panels 120.

Electrical systems 104 in racks 106 may each receive power from one of primary power systems 116. In one embodiment, each of primary power systems 116 corresponds to, and provides power to, the servers in one room in a data center. In one embodiment, each of primary power systems 116 corresponds to, and provides power to, one rack system in a data center. In FIG. 1, for the sake of clarity, electrical systems 104 are shown coupled to only one of power panels 120. Electrical systems may, however, be coupled to any or all of power panels 120 in a data center.

Power panels 120 may distribute power from UPSs to electrical systems 104 in racks 106. Power panels 120 may include circuit protection devices, such as circuit breakers. In certain embodiments, power panels 120 are floor power distribution units. In some embodiments, some or all of power panels 120 include a transformer that transforms the voltage from switchgear apparatus 114.

Power panels 120 include circuit protection devices 124. Circuit protection devices 124 may operate to shed loads from electrical systems 104 off of power distribution system 102. Circuit protection devices 124 may be triggered to shed loads on a load circuit-by-load circuit basis. For example, a circuit breaker may shed loads from computing devices operating in a particular rack, or computing devices in a particular half of a rack (for example, top half and bottom half).

In some embodiments, loads are shed by tripping circuit breakers in power panels 120. Loads may be shed by tripping breakers corresponding to, for example, computing devices in a full rack or in half of a rack.

Each of racks 106 may include one or more rack power distribution units 122. The rack power distribution units 122 may distribute power to power supply units in computer systems 104. In one embodiment, each rack power distribution units 122 distributes electrical power to half of a rack.

Each of rack PDUs 122 includes two power input receptacles 123. Either power input receptacles 123 may be coupled to a detachable power supply cable that carries power from power panels 120 to the rack PDU.

Each of rack PDUs includes two branches 125. Each of the two branches may include a set of output power receptacles. In operation of system 100, receptacles in rack PDU 122 may be used to supply power to electrical systems in rack 106, such as servers. Electrical systems 104 may be coupled to rack power distribution unit 122 by way of cables.

Each of branches 125 in rack PDU 122 includes circuit protection devices 128. Circuit protection devices may be, for example, circuit breakers or fuses. In one embodiment, each breaker is a 30A/32A single pole MCB. Breakers may be located such that they can be accessed when server racks are in-line (e.g., at the top of rack power distribution unit 122). In one embodiment, power is provided to a rack PDU by way of an 8AWG/6 mm$^2$ 5 core cable and a 30A NEMA/32A IEC309 3Ph+N+E Plug.

In the schematic diagram shown in FIG. 1, for purposes of clarity, each of circuit protection devices 124 is represented by a box having a single symbol. A circuit protection device may, however, include any number of separate devices. For example, a separate device may be provided for each line of a power distribution circuit. In one embodiment, for instance, separate devices (for example, circuit breakers) are provided for hot and neutral. In another embodiment, separate devices are provided for each phase line of a multi-phase power distribution system.

Although in the system shown in FIG. 1, each of the rack PDUs has two branches, a rack PDU may, in various embodiments, have any number of branches and any number of circuit protection devices.

In FIG. 1, circuit protection devices are provided in power panels and rack power distribution units that feed electrical systems in racks 106. Circuit protection devices may, nevertheless, be included in other levels and locations in a power distribution system. For example, UPSs 118 or switch gear 114 may include circuit protection devices.

In some embodiments, electrical systems, or sets of electrical systems, are assigned one or more identifiers. In some embodiments, power components in a power distribution system, such as power panels, are assigned one or more identifiers. Each identifier may serve as an address for the electrical system, rack system, power component, or a constituent element thereof. The address may be used to map loads (such as server racks) and power components in a system. An identifier may have any suitable format. In some embodiments, a separate identifier may be assigned for the component itself and for additional elements, inputs, or outputs within the component. For example, a separate identifier may be established for each power output receptacle of a power panel.

Transformer 110 is coupled to a utility feed. The utility feed may be a medium voltage feed. In certain embodiments, the utility feed is at a voltage of about 13.5 kilovolts or 12.8 kilovolts at a frequency of about 60 Hz. Generators 104 may provide power to primary power systems 106 in the event of a failure of utility power to transformer 110. In one embodiment, one of generators 112 provides back-up power for each of primary power systems 116.

UPS 118 may provide uninterrupted power to racks 106 in the event of a power failure upstream from UPS 118. In certain embodiments, a UPS receives three-phase power from a transformer. The UPS may supply three-phase power to a floor power distribution unit.

PDU power may be any suitable voltage. In one embodiment, electrical power is about 208 V. In one embodiment, electrical power is about 230 V. In some embodiments, different electrical systems 104 may operate on different phases of a primary power system. Each of the legs may correspond to one phase of the input power. In one embodiment, each leg operates at a voltage between about 220 volts to about 260 volts.

Reserve power system 130 may provide reserve power for any or all of the electrical systems 104 supplied by primary power systems 116. In some embodiments, reserve power system 130 is powered up at all times during operation of system 100. Reserve power system 130 may be passive until a failure of one or more components of the primary power system for one or more of electrical systems 104, at which time reserve power system 130 may become active.

For illustrative purposes, three switchgear apparatus 114, four UPSs 118, and ten power panels 120 are shown in FIG. 1. The number of power distribution units, UPSs, switchgear apparatus may, however, vary from embodiment to embodiment (and, within a given embodiment, from system to system). For example, each of UPSs 118 may supply power to any suitable number of power panels 120. As another example, each of switchgear apparatus 114 may supply power to any suitable number of UPSs 118.

In some embodiments, a map is generated for electrical systems (for example, servers) that perform operations in a facility, power components in a power distribution system, or both. The map may be based on signals sent from various components in a data center. For example, in the embodiment shown in FIG. 1, a map can be established that includes sets of electrical systems 104 in racks 106 (for example, servers in one half of a particular rack), rack PDUs 122, power panels 120, and UPSs 118.

In some embodiments, computing assets are mapped to one or more power distribution system components and/or branches. Mapping may be based on IDs assigned to one or more assets, or sets of assets, of a system. In one embodiment, sets of computing devices operating in racks are mapped to circuit breakers that provide overcurrent protection for that set of computing devices. For example, Servers ID0001 through 0010 in Rack 0006 in Data Center 4 may be mapped to Circuit Breaker A021 in Power Panel PP062 in Data Center 4; Servers ID0011 through 0020 in Rack 0007 of Data Center 4 may be mapped to Circuit Breaker A022 in Power Panel PP062 in Data Center 4; etc.

In some embodiments, baseline data for mapping of components one or more a computing facilities are stored in a database. At a later time, the map may be updated based on a new set of messages from components in the computing facilities. Comparisons between the baseline data and current data may be used to assess conditions or components.

Electrical systems supplied by power by way of rack power distribution units may be of various types. Examples include hospital equipment, utility systems, security systems, military systems, telecommunications systems, or electronic commerce systems. In certain embodiments, rack power distribution units supply power to a critical system, such as a life support system. In some embodiments, the systems are computing devices (for example, servers) in a data center.

Figure 2:
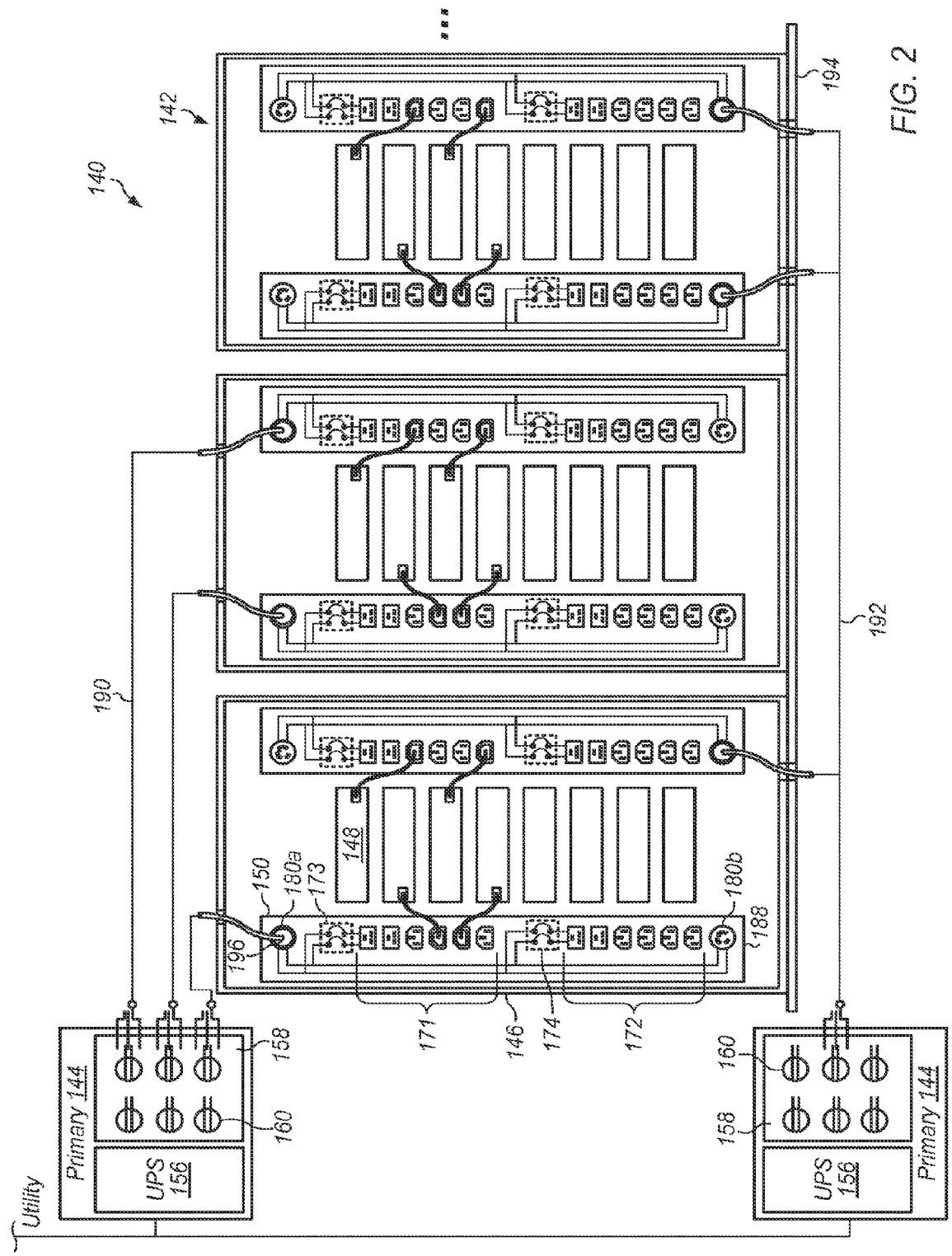
FIG. 2 illustrates one embodiment of a data center including rack power distribution units with dual power input receptacles and detachable power cables.

FIG. 2 illustrates one embodiment of a data center including rack power distribution units with dual power input receptacles and detachable power cables. System 140 includes rack computing systems 142 and power systems 144. Each of rack computing systems includes rack 146, computing devices 148, and rack PDUs 150. Rack PDUs distribute power from power systems 144 to computing devices 148 installed in racks 146.

Power systems 144 include UPS 156 and floor power distribution units 158. Each of floor power distribution units 158 includes floor PDU receptacles 160. In some embodiments, power system 144 may be similar to that described above relative to FIG. 1. For example, power system 144 may include a network of switchgear apparatus, UPSs, and power distribution units that distribute electrical power to any number of electrical systems, such as computing devices 148.

Each of rack PDUs 150 includes banks of output receptacles 171 and 172 and circuit protection devices 173 and 174. The set of computing devices 142 that is coupled in output receptacles 171 may be protected by circuit protection device 172. The set of computing devices 142 that is coupled in output receptacles 173 may be protected by circuit protection device 174. In one embodiment, each of circuit protection devices 172 and 174 are circuit breakers. In one embodiment, each of banks 171 and 173 includes two or more C19-type output receptacles and two or more C13-type output receptacles.

Each of rack PDUs 150 includes top power input receptacle 180a and bottom power input receptacle 180b. Top power input receptacle 180a and bottom power input receptacle 180b may be provided on enclosure 188. Enclosure 188 may be, for example, a metal case. As used herein, a receptacle is a "top" receptacle of a device if the receptacle is nearer to the top of the device than the bottom of the device. As used herein, a receptacle is a "bottom" receptacle of a device if the receptacle is nearer to the bottom of the device than the top of the device. Each of the conductors in top power input receptacle 180a may be coupled to a corresponding conductor of a bottom power input receptacle 180b (for example, hot 180a to hot 180b, neutral 180a to neutral 180b, and so on.) Power through either of top power input receptacle 180a and bottom power input receptacle 180b may be fed through either or both of bank 171 and bank 172 of output receptacles.

Power cables 190 and 192 may be installed between one of the power input receptacles on rack PDU (either top power input receptacle 180a and bottom power input receptacle 180*b*) and one of floor PDU receptacles 160 on floor power distribution unit 158. In certain embodiments, power cables are fed through a floor or ceiling of a room in a data center, such as false floor 194.

Each of power cables 190 and 192 may include a connector plug that couples in one of the power input receptacles in rack PDUs 150. In one embodiment, input connector plugs 196 are L6-30P type plugs and power input receptacles 180*a* and 180*b* are L6-30R type receptacles.

In some embodiments, a power cable includes a Y such that the cable can be connected to two or more rack PDU power input receptacles (such as, for example power cable 192 shown in FIG. 2). In other embodiments, a power cable has a single connector at each of two ends (such as, for example, power cables 190 shown in FIG. 2).

In some embodiments, power cables are fed to the rack PDU power input receptacle that is nearest to the location of the feed. For example, if a power cable is fed through the top of the rack, then the power cable may be coupled in the top power input receptacle of the rack PDU.

In some embodiments, all of the rack PDUs in a particular rack are supplied with power through either the top or the bottom of the rack and coupled to power input receptacles on that end of the rack. For example, in the middle rack shown in FIG. 2, both of cables 190 are fed through the top of the rack and coupled to one of top power input receptacles 180*a*. In certain embodiments, one or more of the rack PDUs are fed from the bottom of a rack and one or more rack PDUs are fed from the top of the same rack.

Suitable types of circuit breakers may include, in various embodiments, a thermal-magnetic circuit breaker, a magnetic circuit breaker, a mechanical circuit breaker, or an electronic circuit breaker.

Figure 3:
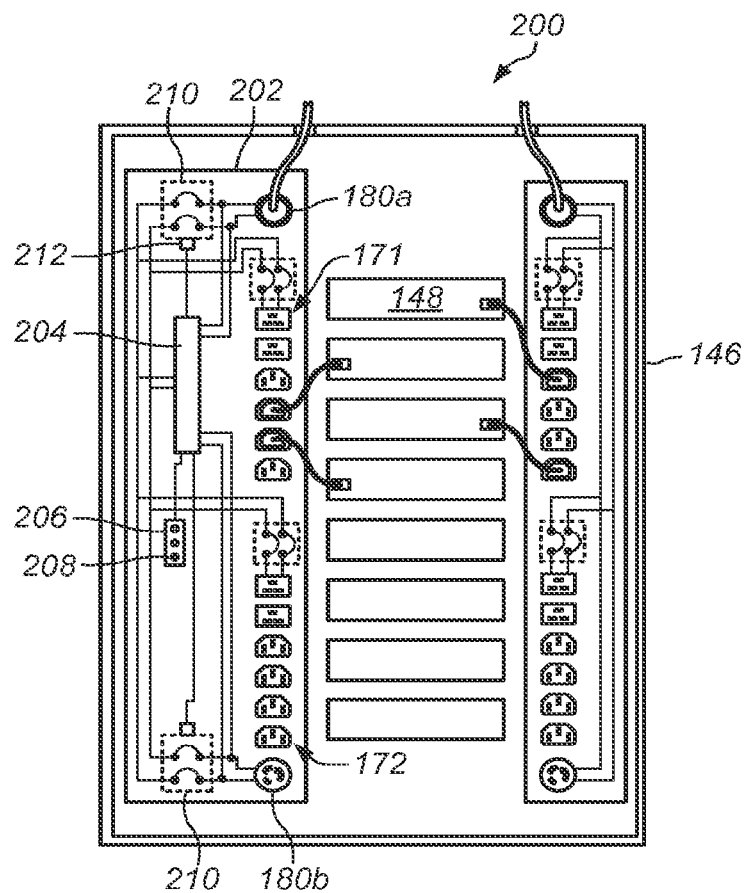
FIG. 3 illustrates one embodiment of a rack power distribution unit with a phase match detection system with visual match indicators.

FIG. 3 illustrates one embodiment of a rack power distribution unit with a phase match detection system with visual match indicators. System 200 includes rack 146, computing devices 148, and rack PDU 202. Rack PDU 202 includes phase match detection device 204, visual indicator panel 206, and circuit breakers 210. Visual indicator panel 206 may include indicator lamps 208. Circuit breakers 210 may be manually operable by a user to switch power off from either or both of power input receptacles 180*a* and 180*b*.

Phase match detection device 204 may compare input power lines coupled to power input receptacle 180*a* with input power lines coupled to power input receptacle 180*b*. Phase match detection device 204 may include a control circuit (which may include, for example, a programmable logic controller) that determines whether a phase match exists between power connected to the power input receptacles. In some embodiments, phase match detection device 204 includes one or more voltage comparators.

Phase match detection device 204 may control indicator lamps 208 on indicator panel 206. Indicator panel 206 may provide maintenance personnel with information about conditions and connections in rack PDU 202.

In some embodiments, indicator panel 206 provides a visual indication of whether a phase match exists between power lines connected to the power input receptacle 180*a* and power input receptacle 180*b*. For example, the phases of power to the two input receptacles matches, a green light may be illuminated. If the phases of the power to the two input receptacles do not match, a red light may be illuminated. Other information that may be presented on a rack PDU indicator panel may include, in various embodiments, power on/off for each input (for example, power input receptacle 180*a* and power input receptacle 180*b*), load connected yes/no, input power lines coupled to each other yes/no.

In some embodiments, a rack PDU may provide for a lockout of power if phases of the inputs do not match. For example, in rack PDU 202 shown in FIG. 3, if phase match detection device 204 determines that the phases of power introduced at power input receptacle 180*a* and power input receptacle 180*b* does not match, phase match detection device 204 may operate shunt devices 212 to trip one or more of circuit breakers 210 to isolate the two power inputs from one another.

In some embodiments, indicator panel 206 includes a screen display. In certain embodiments, in certain embodiments a panel on a rack PDU allows a user to input instructions, change settings, change a display, or otherwise control a phase match detection system.

Figure 4:
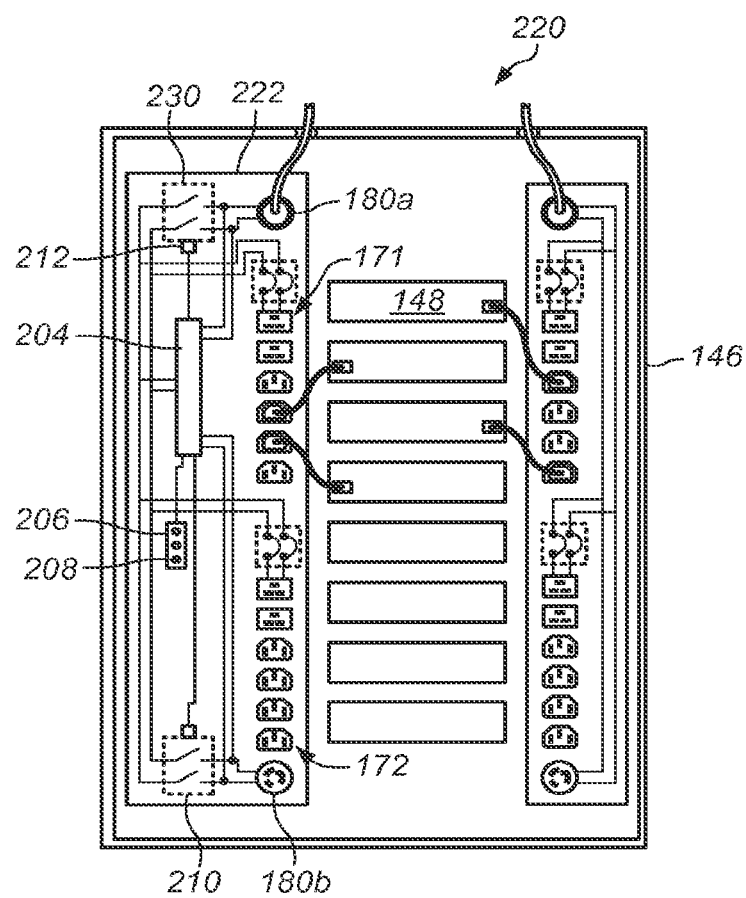
FIG. 4 illustrates one embodiment of a rack power distribution unit with a phase match detection system with control among multiple power inputs.

In some embodiments, a rack PDU includes a switching circuit to control connections among multiple outputs and multiple inputs. FIG. 4 illustrates one embodiment of a rack power distribution unit with a phase match detection system with control among multiple power inputs. System 220 includes rack 146, computing devices 148, and rack PDU 222. Rack PDU 222 includes phase match detection device 204, visual indicator panel 206, and switching devices 230.

Phase match detection device 204 may compare input power lines coupled to power input receptacle 180*a* with input power lines coupled to power input receptacle 180*b*. Phase match detection device 204 may include a control circuit (which may include, for example, a programmable logic controller) that determines whether a phase match exists between power connected to the power input receptacles. In some embodiments, phase match detection device 204 includes one or more voltage comparators.

Phase match detection device 204 may operate switching devices 230 to control connections among power inputs from power input receptacles 180*a*, 180*b*, and output receptacles 171 and 172. Switching devices 230 may include, for example, a set of relays that open and close a connection the input power lines. In one embodiment, phase match detection device 204 does not allow the input power lines from power input receptacles 180*a* and 180*b* to be connected to each other unless a phase match exists between the two input power lines.

In some embodiments, maintenance or reconfiguration operations are performed under live conditions while electrical systems remain in operation as power is supplied through a secondary feed (for example, while maintaining servers in a powered up state and performing computing operations using the servers). For example, computer systems in a rack are maintained live while an automatic transfer switch between a floor power distribution unit and a source power panel is replaced. The replacement may be carried out in a "live" environment in which the computer systems in the rack remain in operation.

Figure 5:
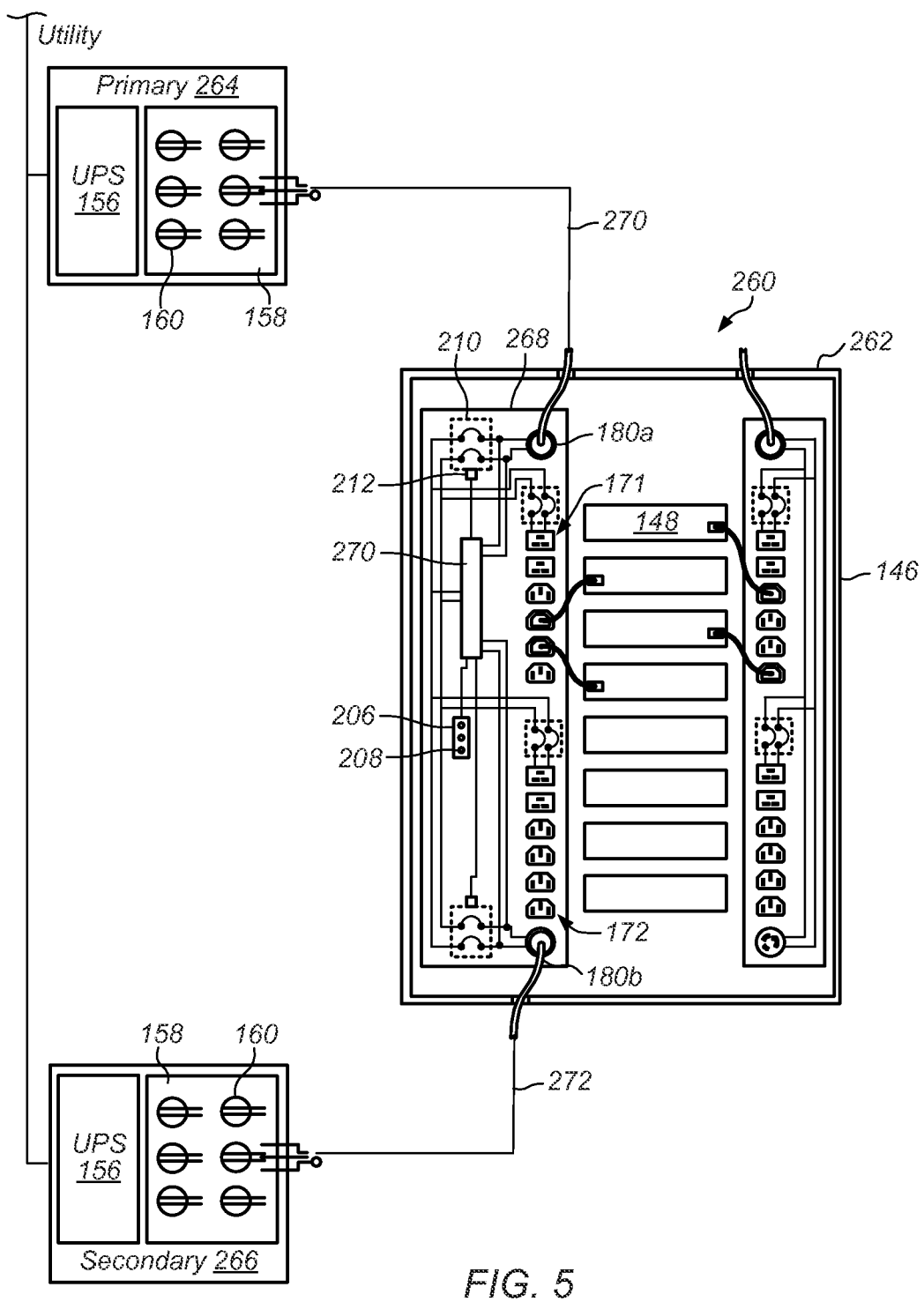
FIG. 5 illustrates one embodiment of a secondary feed to a rack power distribution unit.

In some embodiments, a secondary feed is supplied to a rack PDU through a power input receptacle on the rack PDU. FIG. 5 illustrates one embodiment of a secondary feed to a rack power distribution unit through a power input receptacle. System 260 includes rack computing systems 262, primary power system 264, and secondary power system 266. In certain embodiments, secondary power system 266 is a reserve power system. Rack computing system 262 includes rack 146, computing devices 148, and rack PDU 268. Rack PDU 268 may be similar to rack PDU 202 described above relative to FIG. 3, or rack PDU 222 described above relative to FIG. 4.

Initially, rack PDU 268 may be coupled only to primary power system 264 by way of power cable 270 coupled to power input receptacle 180*a*. To establish a secondary feed, power cable 272 may be used to couple secondary power system with rack PDU 268 via power input receptacle 180*b*. Before cutting in the secondary feed from secondary power system 266, phase match detection device 270 may be used to ensure that a phase match exists between the power coming into power input receptacle 180*a* and power input receptacle 180*b*.

Figure 6:
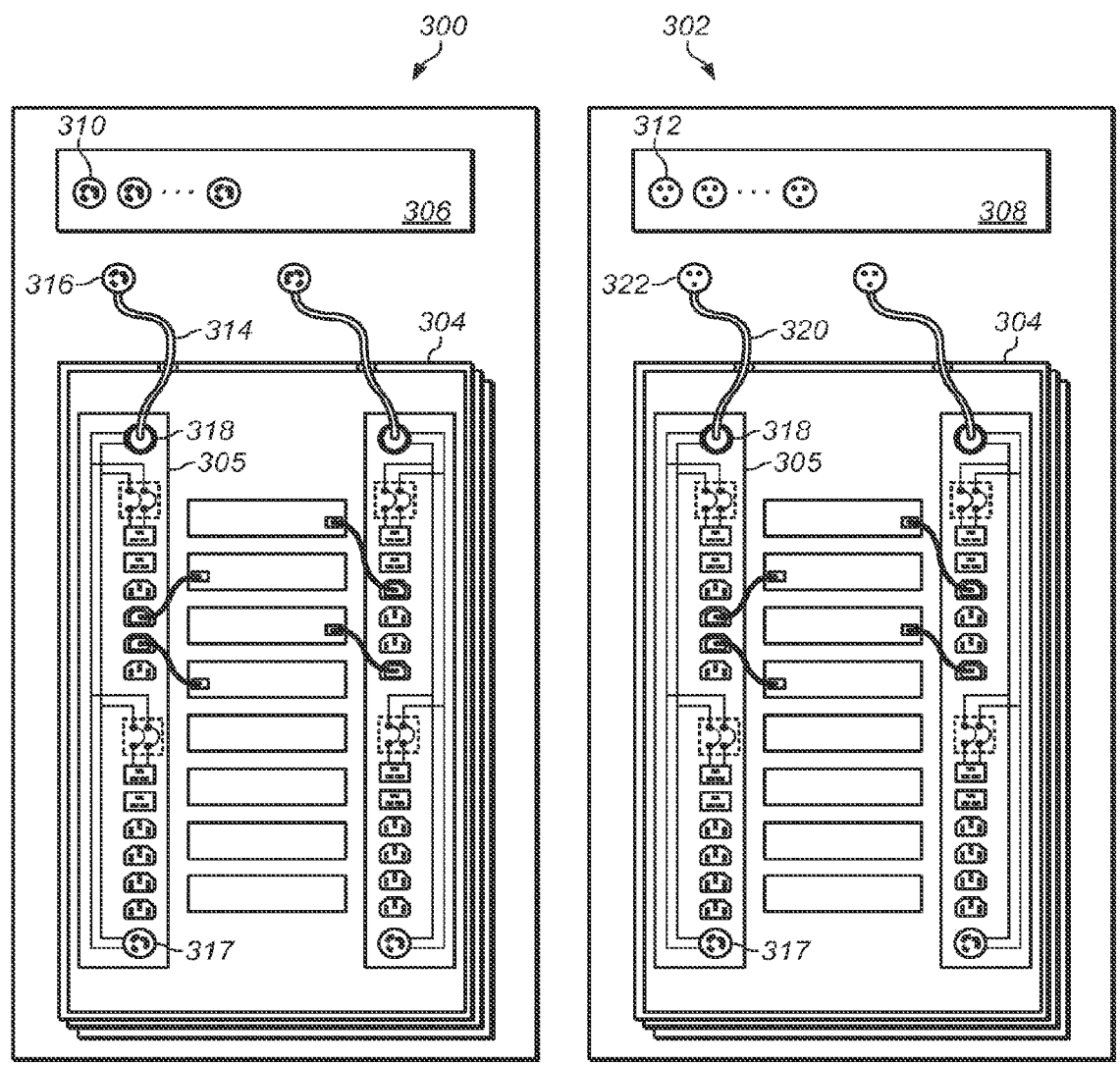
FIG. 6 illustrates one embodiment of multiple data centers with different rack PDU power cables for different source power panels.

In some embodiments, a rack PDU system includes two or more detachable cables. Each of the cables may have a different combination of connector plugs. Each of the cables may be used to connect the rack PDU to power sources with different output connections. FIG. 6 illustrates one embodiment of multiple data centers with different rack PDU power cables for different source power panels. Data center room 300 both include rack computing systems 304 with rack PDUs 305. Rack computing systems 304 and rack PDUs 305 may be identical in both of data center rooms 300 and data center rooms 302.

Data center room 300 includes power panel 306 with power panel receptacles 310. Data center room 302 includes power panel 308 with power panel receptacles 312. Power panel receptacles 310 in data center room 300 and power panel receptacles 312 in data center room 302 may be of different connector types. For example, power panel receptacles 310 may NEMA L6-30R type, while power panel receptacles 312 are an IEC 309-type receptacle. Cable 314 includes connector plug 316 and connector plug 318. Cable 320 includes connector plug 316 and connector plug 318. Connector plug 316 and connector plug 318 of cable 314 may both be NEMA L6-30P type. Cable 320, by contrast, may include a NEMA L6-30P type connector plug at one end (connector plug 318) and an IEC 309-type connector plug at the other end (connector plug 322). Since plug 318 is the same connector type in both of cable 314 and cable 320, both cables can interchangeably couple with power input receptacles 317 of rack PDUs 305.

Figure 7:
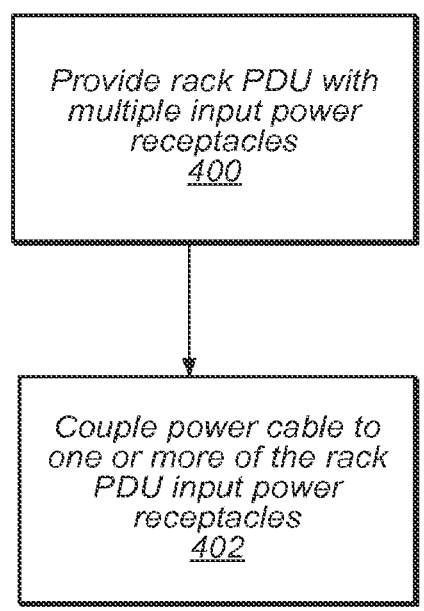
FIG. 7 illustrates one embodiment of connecting power to a rack power distribution unit with multiple power input receptacles.

In some embodiments, configuring or reconfiguring a system include connecting a power source to an input receptacle of a rack PDU. FIG. 7 illustrates one embodiment of connecting power to a rack power distribution unit with multiple power input receptacles. At 400, a rack power distribution unit (PDU) with two or more rack PDU input power receptacles is provided. The rack PDU may include a top input power receptacle and a bottom input power receptacle.

At 402, a power cable is coupled to one or more of the rack PDU input power receptacles. The power cable may be coupled to the power input receptacle of the rack PDU that is nearest to a feed location of the power cable into the rack.

In some embodiments, the power source to computing devices in a rack may be switched by installing a cable in one input receptacle (the replacement power input) and then removing a cable from another input (the replaced input). The transfer may be carried out while computing devices in the rack remain in operation.

In some embodiments, a power cable is connected to an input power receptacle to establish a secondary feed, such as described above relative to FIG. 5. Establishing a secondary feed may include verifying a phase match between a primary feed into one input power receptacle and a secondary feed into another input power receptacle.

In certain embodiments, a power supply cable is switched from one power input receptacle on a rack PDU to another input receptacle on the rack PDU. The cable may be switched for example, to facilitate rerouting cables or eliminating crossing of cables.

In some embodiments, removing and replacing a rack PDU include. A rack PDU may be replaced, for example, if the rack PDU is faulty. Replacement of a rack PDU may include disconnecting the power cable from a failed rack PDU, removing the failed rack PDU from the rack, installing a replacement rack PDU, and connecting the power cable to at least one power input receptacle of the second rack PDU.

Although in many of the embodiments described herein, rack PDUs are described for use in rack computing systems in a data center, rack PDUs may, in various embodiments, be used to supply power to other types of electrical systems. For example, rack PDUs may be used to distribute power to electrical systems at a power plant, manufacturing plant, medical care facility, or office building.

Although the embodiments above have been described in considerable detail, numerous variations and modifications will become apparent to those skilled in the art once the above disclosure is fully appreciated. It is intended that the following claims be interpreted to embrace all such variations and modifications.

What is claimed is:

1. A system, comprising:
   a rack;
   one or more computing devices coupled to the rack;
   one or more rack power distribution units (PDUs) coupled to the rack, wherein at least one of the one or more rack PDUs comprises:
   an enclosure;
   two or more power input receptacles mounted on the enclosure, at least two of the two or more power input receptacles are wired in parallel with one another, wherein:
   at least one of the two or more power input receptacles is a top power input receptacle mounted on a top portion of the enclosure; and
   at least another of the two or more power input receptacles is a bottom power input receptacle mounted on a bottom portion of the enclosure, wherein the bottom power input receptacle has a same connector type as the top power input receptacle; and
   two or more power output receptacles on the enclosure, wherein the two or more power output receptacles are electrically connected to the at least two power input receptacles wired in parallel so that the two or more power output receptacles are configured to receive power from any one of, or any combination of, the at least two power input receptacles wired in parallel, wherein the two or more output receptacles are configured to supply the power to at least one of the one or more computing devices, and wherein the two or more output receptacles have a different receptacle type than the top power input receptacle and the bottom power input receptacle; and
   one or more power cables each coupled in a respective one of the two or more power input receptacles on the enclosure, wherein at least one of the one or more power cables is configured to supply electrical power from an electrical power system to the at least one of the one or more rack PDUs.

2. The system of claim 1, wherein the at least one power cable feeds into the rack by way of a panel that is nearest to the top power input receptacle or nearest to the bottom power input receptacle.

3. The system of claim 1, wherein the at least one of the one or more rack PDUs comprises a phase match detection device, wherein the phase match detection device is configured to determine whether respective phases of power fed to the at least one of the power input receptacles and power fed to the at least another of the power input receptacles match within acceptable limits.

4. The system of claim 1, wherein the one or more power cables comprise at least one power cable configured to supply a secondary feed through one of the two or more power input receptacles of the at least one of the rack PDUs while a primary feed is supplied through another power input receptacle of the two or more power input receptacles of the at least one of the rack PDUs.

5. The system of claim 1, wherein the one or more rack PDUs comprise two or more rack PDUs, wherein each of at least two of the two or more rack PDUs comprises a respective top power input receptacle and a respective bottom power input receptacle.

6. The system of claim 1, wherein the one or more rack PDUs comprise two or more rack PDUs, wherein the one or more power cables comprise two or more power cables, wherein respective ones of the two or more power cables are coupled in the top power input receptacles of respective ones of the two or more rack PDUs or are coupled in the bottom power input receptacles of respective ones of the two or more rack PDUs.

7. The system of claim 1, wherein the one or more rack PDUs comprise two or more rack PDUs, wherein the one or more power cables comprise two or more power cables, wherein at least one of the two or more power cables is coupled in the top power input receptacle of one of the rack PDUs, and wherein another one of the two or more power cables is coupled in the bottom power input receptacle of another one of the rack PDUs.

8. A rack power distribution unit (PDU), comprising:
an enclosure;
two or more power input receptacles mounted on the enclosure, wherein at least two of the two or more power input receptacles are wired in parallel with one another, wherein:
at least one of the two or more power input receptacles is a top power input receptacle mounted on a top portion of the enclosure; and
at least another of the two or more power input receptacles is a bottom power input receptacle mounted on a bottom portion of the enclosure, wherein the bottom power input receptacle has a same connector type as the top power input receptacle; and
two or more power output receptacles on the enclosure, wherein the two or more power output receptacles are electrically connected to the at least two power input receptacles wired in parallel so that the two or more power output receptacles are configured to receive power from any one of, or any combination of, the at least two power input receptacles wired in parallel, wherein the two or more power output receptacles are configured to supply the power to one or more electrical systems, and wherein the two or more output receptacles have a different receptacle type than the top power input receptacle and the bottom power input receptacle.

9. The rack PDU of claim 8, wherein the bottom power input receptacle is located below the two or more power output receptacles and the top power input receptacle is located above the two or more power output receptacles.

10. The rack PDU of claim 8, further comprising a circuit protection device coupled to each of the two or more power input receptacles, wherein each of the respective circuit protection devices is configured to protect the one or more electrical systems that receive electrical power through a respective one of the two or more power input receptacles.

11. The rack PDU of claim 8, wherein the rack PDU comprises a phase match detection device coupled to the at least two of the power input receptacles, wherein the phase match detection device is configured to determine whether respective phases of power fed to the at least one of the power input receptacles and the at least another of the power input receptacles match within acceptable limits.

12. The rack PDU of claim 11, wherein the phase match detection device comprises one or more voltage comparators configured to compare voltages between lines coupled to the at least one of the power input receptacles and the at least another of the power input receptacles.

13. The rack PDU of claim 8, further comprising one or more switching devices configured to open and close a connection between the at least two of the power input receptacles.

14. The rack PDU of claim 8, further comprising a set of two or more power cables, wherein each power cable of the two or more power cables comprises:
a first end of the power cable configured to couple in a respective one of the two or more power input receptacles; and
a second end, wherein the second end of each of at least two of the two or more power cables is configured to couple with a different upstream power distribution system.

15. A method, comprising:
providing a rack power distribution unit (PDU) with an enclosure and two or more rack PDU power input receptacles mounted on the enclosure, wherein the two or more rack PDU power input receptacles are wired in parallel with one another, wherein:
at least one of the two or more rack PDU power input receptacles is a top power input receptacle mounted on a top portion of the enclosure; and
at least another of the two or more rack PDU power input receptacles is a bottom power input receptacle mounted on a bottom portion of the enclosure, wherein the bottom power input receptacle has a same connector type as the top power input receptacle;
the rack PDU comprises two or more power output receptacles on the enclosure, wherein the two or more power output receptacles are electrically connected to the at least two power input receptacles wired in parallel so that the two or more power output receptacles are configured to receive power from any one of, or any combination of, the at least two power input receptacles wired in parallel, wherein the two or more output receptacles are configured to supply the power to one or more electrical systems, and wherein the two or more output receptacles have a different receptacle type than the top power input receptacle and the bottom power input receptacle; and
coupling a power cable to one of the two or more rack PDU power input receptacles that is nearest to a location from which the power cable is being fed.

16. The method of claim 15, wherein coupling the power cable to the one of the two or more rack PDU power input receptacles comprises establishing a secondary feed in the at least one of the two or more rack PDU power input receptacles while a primary feed is received in the at least another of the two or more rack PDU power input receptacles of the rack PDU.

17. The method of claim 15, further comprising verifying whether respective phases of power fed to the at least one of the two or more rack PDU power input receptacles match power fed to the at least another of the two or more rack PDU power input receptacles of the rack PDU.

18. The method of claim 15, wherein coupling the power cable to one of the two or more rack PDU power input receptacles comprises:

installing a power cable in a first one of the rack PDU power input receptacles, and,
wherein the method further comprises:
after installing the power cable in the first one of the rack PDU power input receptacles, removing another power cable from a second one of the two or more rack PDU power input receptacles.

\* \* \* \* \*